United States Patent Office 3,035,923
Patented May 22, 1962

3,035,923
DYE COMPOSITION FOR EDIBLE FAT AND
METHOD OF PREPARING THE SAME
Alan S. Geisler, Wilmington, Del., assignor to Atlas
Chemical Industries, Inc., Wilmington, Del., a corporation of Delaware
No Drawing. Filed July 11, 1960, Ser. No. 41,750
18 Claims. (Cl. 99—148)

This invention relates to color dispersants for edible fats and in particular to dicarboxylic acid esters of polyhydric alcohol fatty acid esters which act as dispersing agents for water-insoluble color lakes.

Up to this time, oil-soluble dyes have customarily been used to color edible fatty matter, such as cream, ice cream, cheese, margarine, shortening, etc., and since these oil-soluble dyes are readily soluble in fatty matter, there has been no problem in dispersing the dyes throughout the fatty matter. On the other hand, water-soluble dyes, although otherwise desirable for such use, have often not been available because water-soluble dyes were not readily dispersed in fatty matter, were not stable in the fatty matter, and could easily be washed out of the fatty matter.

It is an object of this invention to provide a method for coloring edible fatty matter.

It is another object of this invention to provide a novel dye composition comprising water-insoluble color lakes and dicarboxylic acid esters of polyhydric alcohol fatty acid esters.

It is another object of this invention to provide a method of making these novel dye compositions.

It is a further object of this invention to provide novel colored, edible fatty matter compositions comprising edible fatty matter, water-insoluble color lakes, and dicarboxylic acid esters of polyhydric alcohol fatty acid esters, which compositions have excellent color dispersion, intensity and stability.

Other objects and advantages of this invention will be evident from the following disclosure.

It has been discovered that the problems caused by coloring edible fatty matter with water-soluble dyes may be overcome by using the novel dye compositions of this invention.

In accordance with standard procedures for preparing water-insoluble color lakes, water-soluble dyes are co-precipitated with metallic salts (mordants), such as aluminum and ferric oxides, to form the water-insoluble color lakes which are used as coloring agents in accordance with this invention. The water-insoluble color lakes provide an excellent means for coloring fatty matter, especially edible fatty matter, if properly dispersed in the fatty matter. Examples of water-insoluble color lakes which can be used in this invention are FD & C (Food, Drug and Cosmetic) Yellow #5, FD & C Yellow #6, FD & C Red #1 and FD & C Red #2.

In order that maximum color intensity be obtained, the water-insoluble color lake must be well dispersed throughout the fatty matter. The dispersal of the color lake in the fatty matter is accomplished in accordance with this invention by including with the color lake a color dispersant comprising dicarboxylic acid esters of polyhydric alcohol fatty acid esters.

The dicarboxylic acid esters of polyhydric alcohol fatty acid esters, used as color dispersants in accordance with this invention, may be prepared by esterfying polyhydric alcohols containing from 2 to 6 hydroxyl groups per molecule. Examples of polyhydric alcohols which may be used as base materials for preparing the color dispersant are edible glycols, glycerols, erythritol, arabitol, xylitol, sorbitol, mannitol, etc.

The color dispersants may be prepared by partially esterifying the polyhydric alcohol first with either a fatty acid or a dicarboxylic acid followed by further esterification with the other acid, or the esterification can be carried out using the fatty acid and dicarboxylic acid simultaneously. If desired, the esterification can be performed using esters or anhydrides of fatty acids or dicarboxylic acids instead of the acids. Fatty acids which may be used as esterifying agents in accordance with this invention are the edible fatty acids, preferably those having from 12 to 22 carbon atoms such as stearic, palmitic, lauric, oleic, etc. Examples of dicarboxylic acids which may be used as esterifying agents to form the color dispersants are succinic acid, fumaric acid, adipic acid, etc. For best results, the individual components of the color dispersant should have the following mole ratio ranges after hydrolysis:

Polyhydric alcohol hydroxyl groups _____ 1.0
Fatty acid _____ 0.3–0.7
Dicarboxylic acid _____ 0.15–0.22

During the esterification, which is generally carried out under anhydrizing conditions, especially when using a fatty acid as the esterifier, the polyhydric alcohol may undergo anhydrization to form an inner ether, particularly when the polyhydric alcohol contains 4 or more hydroxyl groups per molecule. Examples of inner ethers which may be formed when esterifying sorbitol are sorbitan and isosorbide. Dicarboxylic acid esters of polyhydric alcohol inner ether fatty acid esters may be used as the color dispersant in accordance with this invention, and the term "dicarboxylic acid ester of polyhydric alcohol fatty acid esters" is meant to include these esters of polyhydric alcohol inner ethers. Furthermore, the term "dicarboxylic acid ester of polyhydric alcohol fatty acid esters" is mean to include a polyhydric alcohol ester having at least one hydroxyl group esterified with a fatty acid group and at least one hydroxyl group esterified with a dicarboxylic group.

The novel dye compositions of this invention may be prepared by melting the color dispersant if it is a solid or by heating it to about 40° C. if it is a liquid, dispersing in the heated color dispersant from 10 to 60% of the water-insoluble color lake based on the weight of the mixture, and cooling the melt. Upon cooling the melt or heated liquid, the blend of color lake and color dispersant may be used to color fatty matter. It is desirable from a commercial standpoint, ease of handling and packaging, that the blend of color lake and dispersing agent be a hard, solid composition which may be easily powdered rather than a paste or liquid. In order to form a hard, solid blend of color lake and dispersant, it is preferred that the fatty acid used to form the polyhydric alcohol fatty acid ester be of sufficient molecular weight and structure to yield a hard, solid composition. Examples of fatty acids which may be used to form polyhydric alcohol fatty acid esters yielding a solid dye composition are stearic and palmitic acid.

After preparing the blends of color lake and dispersing agent, if the blend is a hard, solid composition it may be powdered, such as by grinding, for ease of handling and dispersing in the fatty matter. The blends may be added to the fatty matter by melting them into the fatty matter which is to be colored. Upon cooling the fatty matter, it will have an excellent color intensity and there will be little or no undispersed color lake throughout the fatty matter. Preferably the novel dye composition, color lake plus dispersing agent, is added to the fatty matter in amounts ranging from about 0.01 to 1.0% based on the weight of the fatty matter. Lesser amounts provide very little color and greater amounts are unpractical and unnecessary to give good color intensity. In order to achieve good dispersion of the color lake throughout the fatty matter, the color lakes and the color dispersants are preferably premixed prior to adding them to the fatty matter. The color lake and the color dispersant may be added to the fatty matter without premixing, but there will often be some color lake in the fatty matter which is not dispersed.

The dicarboxylic acid esters of the polyhydric alcohol fatty acid esters used as color dispersing agents in this invention are also very good emulsifiers and anti-spattering agents when used in margerine, shortenings, and other edible fatty matter.

The preparation and use of specific dye compositions in accordance with the invention is demonstrated in the following examples.

*Example I*

Mixtures of FD & C Yellow #5 lake with various dispersing agents were prepared by melting the dispersing agent, adding the color lake to the melted dispersing agent, and then cooling the blend. The ease of preparation and the physical characteristics of the finished product were determined:

| Blend No. | Dispersing Agent | Amt. Color Lake (gms.) | Amt. Disp. Agent (gms.) | Ease of Prep. | Phys. St. of Blend |
|---|---|---|---|---|---|
| 1 | Lecithin | 28.6 | 71.4 | Difficult | Gummy. |
| 2 | Hard Glyceryl Mono- and Distearate. | 28.6 | 71.4 | do | Hard. |
| 3 | Succinic Acid Ester of Glyceryl Mono- and Distearate. | 28.6 | 71.4 | Easy | Very Hard. |
| 4 | Fumaric Acid Ester of Glyceryl Mono- and Distearate. | 28.6 | 71.4 | do | Do. |

As shown by the data, use of lecithin and hard glyceryl mono- and distearate as the dispersing agent made the preparation of the dye composition very difficult, for these blends smoked, gave off a foul odor, and were difficult in getting the color lake dispersed in the dispersing agent. On the other hand, it was easy to disperse the color lakes in the succinic acid ester and fumaric acid ester of the glycerides, and these blends did not smoke or give off foul odors.

*Example II*

The blends of color lake and dispersing agent prepared in Example I were powdered where possible and were melted into the hydrogenated vegetable oil which was to be used in the preparation of margarine. The blends, color lake and dispersant, were added in amount of 0.25% by weight of fat in the margarine. Then the other ingredients customarily used in the preparation of margarine, such as skim milk, water, flavoring agents, etc., were added to the hydrogenated vegetable oil containing the color lakes and dispersing agent to complete the preparation of the margarine. The margarines were examined for undispersed color lake and color intensity.

| Blend Number | Undispersed Color Lake | Color Intensity (10-maximum) |
|---|---|---|
| 1 | Slight | 7 |
| 2 | Excessive | 5 |
| 3 | None | 10 |
| 4 | None | 10 |
| Control (no dispersing agent) | Excessive | 8 |

As shown by the results, the margarines containing lecithin, hard glyceryl mono- and distearate, and no dispersing agent had undispersed color lakes and less than maximum color intensity. On the other hand, use of the succinic acid ester and fumaric acid ester of the glycerides resulted in no undispersed color lake in the margarine and gave excellent color intensity.

*Example III*

Mixtures of color lake, 3.8 parts FD & C Yellow #5 plus 0.2 part FD & C Yellow #6, with other types of dispersing agents were prepared by melting the dispersing agent, adding the color lake mixture to the heated dispersing agent, and then cooling the blend. The dispersing agents used in this example were succinic acid ester of sorbitan monostearate, a hard, solid dispersant, and succinic acid ester of sorbitan monooleate, a liquid which did not require melting.

The results demonstrated that the hard, solid dispersant performed particularly well, because the dye compositions utilizing the solid color dispersant were easily prepared, yielded particularly uniform color distribution in margarine, and yielded excellent color intensity.

As demonstrated by the examples, it is evident that the dicarboxylic acid esters of polyhydric alcohol fatty acid esters are excellent dispersants for water-insoluble color lakes in fatty matter (Example II), that blends of the color lake and the dispersant are easily prepared (Example I), and that in particular, blends of color lake and dispersant which are hard solids are easily prepared and yield excellent color distribution and intensity in fatty matter such as margarine (Example III). When the color lake-color dispersant blends are in the hard, solid state, they may be powdered for ease of packaging, handling and dispersing in fatty matter.

As previously stated, the dicarboxylic acid esters of polyhydric alcohol fatty acid esters also function as emulsifiers and anti-spattering agents when used in edible fatty matter. Therefore, the dicarboxylic acid esters of polyhydric alcohol fatty acid esters of this invention serve a triple function when present in edible fatty matter, for they act as color dispersants for color lakes, emulsifiers, and anti-spattering agents.

The color dispersants of this invention have solved the problems associated with using water-soluble dyes in edible fatty matter, for by using water-soluble dyes in the form of water-insoluble color lakes blended with the color dispersants of this invention, the dyes may be readily dispersed in fatty matter, are stable in the fatty matter, and cannot easily be washed out of fatty matter.

What is claimed is:

1. A dye composition comprising a water-insoluble color lake and as a color dispersant a dicarboxylic acid ester of a polyhydric alcohol fatty acid ester prepared from a polyhydric alcohol containing from 2 to 6 hydroxyl groups per molecule.

2. The composition of claim 1 in which the polyhydric alcohol used to prepare the color dispersant is glycerol.

3. The composition of claim 2 in which the color dispersant is a stearate.

4. The compositiion of claim 3 in which the color dispersant is a succinic acid ester.

5. The composition of claim 3 in which the color dispersant is a fumaric acid ester.

6. The method of preparing novel dye compositions which comprises heating a color dispersant which is a dicarboxylic acid ester of a polyhydric alcohol fatty acid ester, prepared from a polyhydric alcohol containing from 2 to 6 hydroxyl groups per molecule, to form a hot liquid, dispersing a water-insoluble color lake in the heated color dispersant, and then cooling the blend of color lake and color dispersant.

7. The method of claim 6 in which the color dispersant is prepared from glycerol stearic acid and a dicarboxylic acid selected from the group consisting of succinic acid and fumaric acid.

8. The method of claim 6 in which the cooled color lake-color dispersant blend is a hard, solid composition the further step of grinding the blend into a powder.

9. The method of claim 7 in which the cooled color lake-color dispersant blend is a hard solid composition the further step of grinding the blend into a powder.

10. A colored fatty matter composition comprising edible fatty matter, a water-insoluble color lake, and as a color dispersant a dicarboxylic acid ester of a polyhydric alcohol fatty acid ester prepared from a polyhydric alcohol containing from 2 to 6 hydroxyl groups per molecule.

11. The composition of claim 10 in which the polyhydric alcohol used to prepare the color dispersant is glycerol.

12. The composition of claim 11 in which the color dispersant is a stearate.

13. The composition of claim 12 in which the color dispersant is a succinic acid ester.

14. The composition of claim 12 in which the color dispersant is a fumaric acid ester.

15. The method of preparing a colored fatty matter composition which comprises heating a color dispersant which is a dicarboxylic acid ester of a polyhydric alcohol fatty acid ester, prepared from a polyhydric alcohol containing from 2 to 6 hydroxyl groups per molecule, to form a hot liquid, dispersing a water-insoluble color lake in the heated color dispersant, cooling the blend of color lake and color dispersant, and melting the preformed blend into the fat base of the fatty matter to be colored.

16. The method of claim 15 in which the color dispersant is prepared from glycerol, stearic acid, and a discarboxylic acid selected from the group consisting of succinic acid and fumaric acid.

17. In the method of claim 15 in which the cooled color lake-color dispersant blend is a hard, solid composition, the additional step of grinding the blend into a power prior to melting the powered blend into the fat base constituent of the fatty matter.

18. In the method of claim 16 in which the cooled color lake-color dispersant blend is a hard, solid composition, the additional step of grinding the blend into a power prior to melting the powered blend into the fat base constituent of the fatty matter.

References Cited in the file of this patent

UNITED STATES PATENTS

| | | |
|---|---|---|
| 1,953,438 | Schlack | Apr. 3, 1934 |
| 2,546,748 | Herlow | Mar. 27, 1951 |
| 2,552,706 | Bertram | May 8, 1951 |

UNITED STATES PATENT OFFICE
CERTIFICATE OF CORRECTION

Patent No. 3,035,923                                        May 22, 1962

Alan S. Geisler

It is hereby certified that error appears in the above numbered patent requiring correction and that the said Letters Patent should read as corrected below.

Column 6, lines 9 and 14, for "power", each occurrence, read -- powder --; same lines 9 and 14, for "powered", each occurrence, read -- powdered --.

Signed and sealed this 9th day of October 1962.

(SEAL)
Attest:

ERNEST W. SWIDER                                        DAVID L. LADD
Attesting Officer                                           Commissioner of Patents